United States Patent [19]

Kashiwaya et al.

[11] Patent Number: 4,802,270

[45] Date of Patent: Feb. 7, 1989

[54] APPARATUS FOR PASSING OPTICAL FIBERS THROUGH TUBULAR PRODUCTS

[75] Inventors: Kunio Kashiwaya, Tokyo; Hiroyo Haga, Sagamihara; Nobuo Saeki, Tokyo; Youichi Yabuki, Tokyo; Kuniyuki Ozoe, Tokyo; Shinichi Fukushima; Kazufumi Tabata, both of Narashino, all of Japan

[73] Assignees: Nippon Steel Corp.; Nippon Steel Welding Products & Engineering Co., Ltd., Tokyo, Japan

[21] Appl. No.: 140,666

[22] Filed: Jan. 4, 1988

Related U.S. Application Data

[62] Division of Ser. No. 11,917, Feb. 5, 1987.

[51] Int. Cl.[4] ............................................. B23P 19/04
[52] U.S. Cl. ....................................... 29/241; 29/433
[58] Field of Search ................................ 29/241, 433; 254/134.3 FT; 350/96.23

Primary Examiner—Timothy V. Eley
Attorney, Agent, or Firm—Wenderoth, Lind & Ponack

[57] ABSTRACT

A tube is wound into a coil, and the resulting coil of tube is vibrated so that a given point of the tube reciprocates along a helical path. An optical fiber is fed into the coil of tube that is being thus vibrated. Because of the vibration, the inner wall of the tube exerts such a force as to move the optical fiber diagonally upward and forward. This force causes the optical fiber to jump in the tube diagonally upward and forward and slide forward along the inner wall of the tube. The intermittent conveying force exerted by the inner wall of the tube in the direction of the circumference of the coil causes the optical fiber in the tube to travel forward, thereby pulling in additional length of the optical fiber from outside the tube.

14 Claims, 5 Drawing Sheets

APPARATUS FOR PASSING OPTICAL FIBERS THROUGH TUBULAR PRODUCTS

This Application is a division of application Ser. No. 011,917, filed Feb. 5, 1987.

BACKGROUND OF THE INVENTION

1. Field of the Invention

This invention relates to an apparatus for passing optical fibers through tubular products, and more particularly to an apparatus for making optical fiber core wires, optical fiber cords and/or optical fiber cables comprising optical fibers passed through protective tubes or sheaths.

For the purpose of this invention, optical fibers are defined as element fibers comprising a core and a cladding layer, such element fibers as are coated with syntetic resins, metals and ceramics and their variations comprising a single fiber, multiple fibers and stranded fibers. Tubular products are such metal tubes as those of steel and aluminum, and such nonmetal tubes as those of plastic.

2. Description of the Prior Art

Recently optical fiber cables have come to be used widely for communications services. And many of them are metal-coated to make up for the limited strength of optical fibers.

Optical fibers passed through metal and other tubes have been made by a method that combines tape forming and welding (such as that disclosed in Japanese Provisional Patent Publication No. 46869 of 1985) and a method that passes an optical fiber through a tube (such as that disclosed in Japanese Provisional Patent Publication No. 25606 of 1983).

In the former method, an optical fiber is passed through a metal tube while a metal tape is being formed into a tubular shape and both edges of the tape are being welded together. But there is a shortcoming that the optical fiber is liable to degenerate under the influence of welding heat when it passes the welding point. Also, an optical fiber is difficult to pass through tubes whose diameter is as small as 2 mm or under.

In the latter method, an aluminum tube is made with a steel wire passed therethrough. After the tube is subjected to a diameter-reducing process, the steel wire inside the tube is replaced with an optical fiber. This method requires intricate processes. Besides, the force with which the steel wire is pulled out for replacement should not exceed the strenth of the optical fiber in order to avoid the risk of fiber breaking. Accordingly, optical fiber cable having a length of 200 m or more have been difficult to make.

SUMMARY OF THE INVENTION

In an optical fiber passing apparatus of this invention, a tube is shaped into a coil form, and the coil of tube is vibrated so that a given point of the tube reciprocates along a helical path. An optical fiber is fed into the tube from one end thereof while the coil of tube is thus being vibrated. Consequently, the optical fiber in the tubes moves forward along the circumference of the coil of tube because of the conveying force intermittently exerted by the inner wall of the tube.

To facilitate passing, the difference between the inside diameter of the tube and the diameter of the optical fiber should be not less than 0.1 mm and the diameter of the coil of tube should be not smaller than 150 mm of preferably 300 mm or more. For the matter of vibration, the angle of vibration (i.e., the lead angle of helix) should be not smaller than 1 degree, or preferably between 5 and 30 degrees, the frequency of vibration not less than 5 Hz, or preferably between 10 and 30 Hz, and the total amplitude of vibration in terms of vertical component not less than 0.1 mm, or preferably between 0.5 and 2.0 mm.

The apparatus for passing an optical fiber through a tube according to this invention comprises a cylindrical member consisting of a coil of the tube through which the optical fiber is to be passed, a device to vibrate the cylindrical member so that a given point of the tube reciprocates along a helical path, and a device to feed the optical fiber into the coil of tube being vibrated from one end thereof. The passing apparatus may also incorporate a sensor to detect the difference between the passing speed and feed speed of the optical fiber and a device to control the feed speed of the optical fiber feeding device on the bases of the speed difference detected by the aforementioned sensor.

The apparatus of this invention permits passing an optical fiber through a tube of small diameter (such as one having an outside diameter of 2 mm or under) and long length (such as one having a length of 1 km or over) without deteriorating or damaging the optical fiber. Their simplicity in conducive to cutting down the production cost of optical fibers covered with protective tubes. With the feed speed of an optical fiber controlled by the feeding device of this passing apparatus, the optical fiber can be fed into a tube in the most favorable condition, without applying excessive tension on the optical fiber and exerting any backward force to prevent the admission thereof into the tube.

DESCRIPTION OF THE PREFERRED EMBODIMENTS

Figure 1:
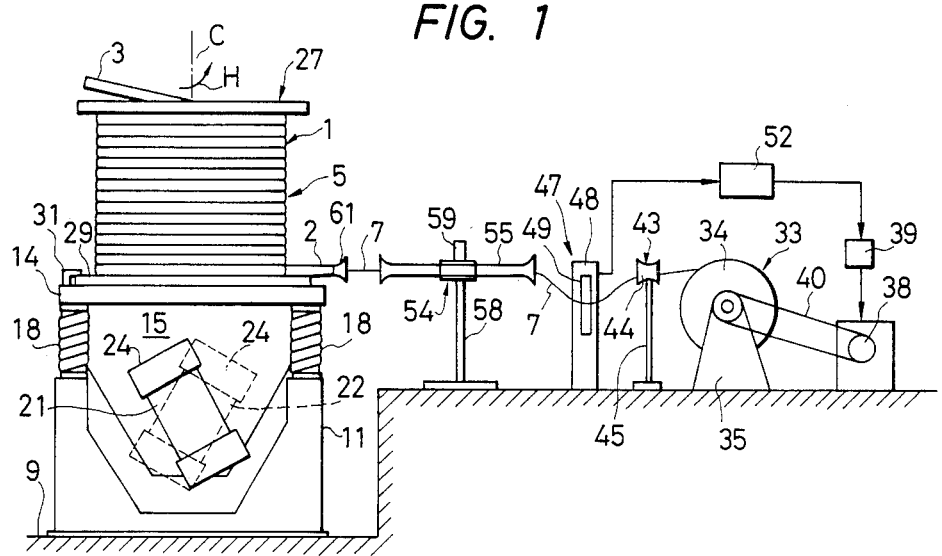
FIG. 1 is a side elevation showing a preferred embodiment of an optical fiber passing apparatus according to this invention.
Figure 2:
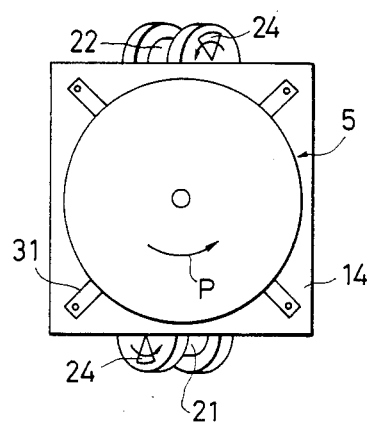
FIG. 2 is a plan view of a vibrating table of the same apparatus.

Now preferred embodiments of this invention will be described by reference to the accompanying drawings. FIG. 1 is an overall view of a passing apparatus according to this invention, and FIG. 2 is a plan view of a vibrating table.

A base 11 is firmly fastened to a floor surface 9 so as not to vibrate. Coil springs 18 to support a vibrating table are mounted at the four corners of the top surface of the base 11.

A square panel-like vibrating table 14 is placed on the base 11, with the support springs 18 interposed therebetween. A support frame 15 extends downward from the bottom surface of the vibrating table 14.

The support frame 15 under the vibrating table 14 carries a pair of vibrating motors 21, 22. The vibrating motor 22 is placed diametrically opposite motor 21 relative to central axis C of table 14. The rotating shafts of the vibrating motors 21, 22 are respectively parallel to a vertical plane containing the central axis C and oppositely tilted with respect to the surface of the vibrating table at an angle of 75 degrees. Unbalanced weights 24 are fastened to both ends of the rotating shafts of the vibrating motors 21, 22. The centrifugal force resulting from the rotation of the unbalanced weights 24 applies a vibrating force to the vibrating table 14 that works aslant to the surface thereof. The paired vibrating motors 21, 22 are driven in such a manner that vibrations they cause have equal frequency and amplitude, and vibrating forces they exert are displaced 180 degrees from each other. Accordingly, when the vibrations caused by the paired vibrating motors 21, 22 are combined, the vibrating table 14 vibrates in such a manner as to move along a helical path whose central axis coincides with the central axis C of the vibrating table 14. The vibration of the vibrating table 14 is not transmitted to the base 11 because the support springs 18 are interposed therebetween.

In place of the vibrating motors 21, 22, such vibrating means as those employing cranks, cams or electromagnets may be used. Also, vibrating motors 21, 22 may be fastened to the vibrating table 14 in other ways than shown in FIG. 1.

Figure 3:
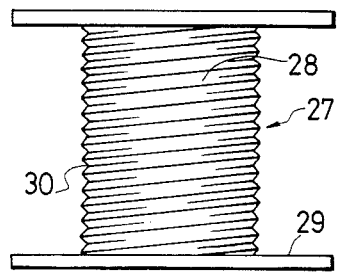
FIG. 3 is a front view showing an example of a bobbin mounted on the vibrating table.
Figures 4A, 4B:
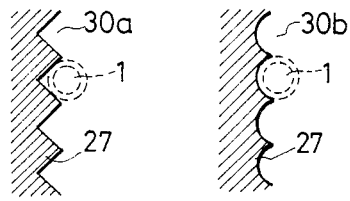
FIGS. 4a and 4b show cross-sectional profiles of grooves cut in the bobbin.

A bobbin 27 is fastened on the vibrating table 14 in such a manner that the axis of the bobbin 27 coincides with the central axis C of the vibrating table 14. A tube 1 through which an optical fiber 7 is to be passed is coiled around the bobbin 27, forming a coil of tube 5. The optical fiber 7 is fed into the tube 1 from the lower end of the coil of tube 5. To avoid the development of excessive bending stress in the optical fiber, the diameter of the coil of tube should preferably be not smaller than 150 mm. The optical fiber 7 used in this embodiment consists of an element optical fiber precoated with resin. The tube 1 is a steel tube. The outer periphery of the bottom flange 29 of the bobbin 27 is fastened to the vibrating table 14 with fastening jigs 31 so that the vibration of the vibrating motors 21, 22 is surely received. As is shown in FIG. 3, a groove 30 is cut around the circumference of the barrel 28 of the bobbin 27 using a shaper so that ridges and recesses pointing to the axis of the bobbin are successively formed. The groove 30 is shaped so that the tube 1 comes in contact therewith closely. In cross-sectional profile, the groove 30 may be either a triangular groove 30a as shown at (a) of FIG. 4 or an arc-shaped groove 30b as shown at (b) of the same figure. Any other cross-sectional profile is allowable so long as the tube 1, which is shown by a broken line, is firmly retained on the bobbin 27.

The optical fiber 7 is passed through gradually while the bobbin 27 is being vibrated. If the directly vibrated bobbin 27 and the tube 1 wound therearound are not kept in close contact with each other, precise transmission of the vibration to the tube 1 and, therefore, smooth passing of the optical fiber 7 will not be achieved. The tube 1 wound around the barrel 28 of the bobbin 27 easily clings to the barrel 28 in the direction of the diameter of the bobbin 27, but not in the direction of the axis thereof. Then, it becomes difficult to uniformly vibrate the entirety of the tube 1 vertically. But if the tube 1 is held tightly in the groove 30 around the barrel of the bobbin 27, the vibration of the bobbin 27 will be precisely transmitted to the tube 1, thereby ensuring smooth and efficient vibration and passing of the optical fiber 7.

A feed spool 34 that constitutes an optical fiber feeder 33 is placed beside the bobbin 27. The feed spool 34 is rotatably supported on a bearing stand 35. The feed spool 34 pays off the optical fiber 7 wound therearound into the coil of tube 1. The point at which the feed spool 34 pays off the optical fiber 7 is substantially at the same level as the point at which the optical fiber 7 is fed into the tube 1.

A drive motor 38 is positioned next to the feed spool 34. The feed spool 34 and drive motor 38 are connected by a belt transmission 40. Rotated by the drive motor 38, the feed spool 34 pays off the optical fiber 7 into the tube 1 wound around the bobbin 27.

A support guide 43 is provided near the optical fiber pay-off point of the feed spool 34. Consisting of a short tubular guide proper 44 and a stand 45 that horizontally supports the guide proper, the support guide 43 supports the optical fiber 7 paid off from the feed spool 34.

An optical fiber feed condition sensor 47 is installed downstream of the support guide 43. The optical fiber feed condition sensor 47 is made up of a support column 48 and an optical fiber level sensor 49 attached thereto. The optical fiber level sensor 49 consists of an image sensor and an oppositely disposed light source. Installed in the pass line of the optical fiber 7, the optical fiber level sensor 49 senses the sagging condition thereof. A CCD line sensor is used as the image sensor.

To the optical fiber feed condition sensor 47 is connected a rotation speed controller 52 that controls the voltage of power supply 39 to said drive motor 38 on the bases of signals sent from the optical fiber feed condition sensor 47. That is, the rotation speed of the drive motor 38 or, in other words, the pay-off speed of the optical fiber 7 is controlled depending on the level at which the optical fiber 7 interferes with the travel of light from the light source in the optical fiber level sensor 49.

The speed with which the optical fiber 7 is passed through the tube 1 is not always constant but may vary when a resource occurs or depending on the condition of the inner surface of the tube 1 and the surface of the optical fiber 7. A change in the running speed of the optical fiber 7 in the tube 1 affects the feeding condition of the optical fiber 7 on the outside. If the feed speed does not follow the passing speed, the optical fiber 7 may either sags excessively or break as a result of overtight stretching. Either way, smooth feeding of the optical fiber 7 will be hindered. But the optical fiber 7 can always be fed at a feed speed within the desired range if the feed spool 34 is rotated so that the rotation thereof is varied or stopped depending on the travelling condition of the optical fiber 7 in the tube 1. Namely, the optical fiber 7 is then kept in the optimum condition (in which the optical fiber 7 sags slightly as shown in FIG. 1), without oversagging or getting overstretched. As a consequence, the optical fiber 7 is passed through the tube without a hitch, with no load placed thereon or no resistance built up against the passing thereof. Incidentally, an optical fiber 0.4 mm in diameter will not enter a steel tube having an inside diameter of 0.5 mm if a force of 20 gf or greater directed to the feeder side works on the optical fiber.

The optical fiber feed condition sensor 47 is not limited to the illustrated image sensor, but may consist of a pair of photoelectric tubes that are vertically spaced to detect the upper and lower limits of the sagging of the optical fiber 7. In this case, the drive motor 38 is on-off controlled. Instead of sensing the position and form of the optical fiber 7, just the feed speed of the optical fiber 7 may be sensed to control the motor speed in accordance with signals based on the sensed results.

Figure 5:
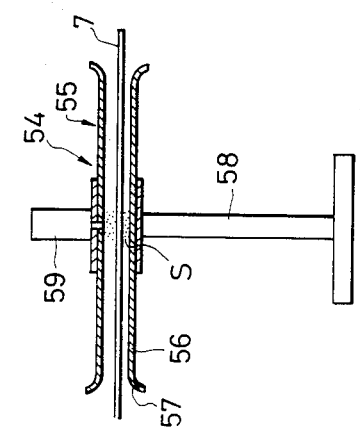
FIG. 5 is a cross-sectional view of an example of an anti-vibrating guide provided in the apparatus.

An anti-vibrating guide 54 is installed between the optical fiber feed condition sensor 47 and the inlet end 2 of the tube. The anti-vibrating guide 54 consists of a cylindrical guide proper 55 and a stand 58 that horizontally supports the guide proper. As shown in FIG. 5, both ends of the guide proper 55 of the anti-vibrating guide 54 expand outward to form tapered (funnel-shaped) portions 57. The boundary between each tapered portion 57 and a cylindrical portion 56 should preferably be shaped into a smooth curved surface. The length of the anti-vibrating guide 54 may be chosen appropriately depending on the distance between the inlet end 2 of the tube and the feed spool 34. When the distance is long, the anti-vibrating guide 54 should naturally be long. The anti-vibrating guide 54 must be made of such materials as glass and plastic that have such a low coefficient of friction that the transfer of the optical fiber by vibration is not impeded.

A lubricant feeder 59 filled with a lubricant is attached to the cylindrical portion 56 of the anti-vibrating guide 54. The lubricant is a solid lubricant comprising a powder of carbon, talc, molybdenum disulfide and so on. The lubricant S that falls from the lubricant feeder 59 into the cylindrical portion 56 adheres to the surface of the optical fiber when passing therethrough.

When the coil of tube 5 into which the optical fiber 7 has been inserted is vibrated, the optical fiber 7 immediately ahead of the tube 1 may swing wildly. The swinging optical fiber 7 may impede smooth vibration and passing thereof and, at the same time, may damage the surface thereof on coming in contact with the edge of the inlet end 2 of the tube 2. When the swing is very wild, even cracks may occur inside the optical fiber. But the anti-vibrating guide 54 keeps down the swing outside the end of the tube 1, thereby allowing the optical fiber 7 to be conveyed in good condition, without damaging the optical fiber 7 and offering no resistance to the vibration and passing thereof.

Figure 6:
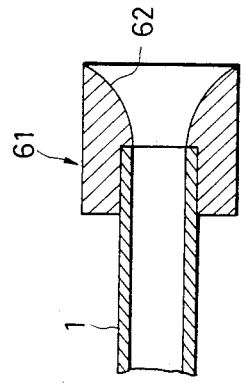
FIG. 6 is a cross-sectional view of an example of a protective guide provided in the apparatus.

A separately prepared protective guide 61 is fastened to the inlet end of the tube 1, as shown in FIG. 6. The protective guide 61 is made of such material as plastic that has a low coefficient of friction and provided with a tapered guide 62 having an outwardly diverged surface.

The optical fiber 7 passed through the coiled tube 1 by the vibration of the tube 1 may move forward while bumping against the inlet end 2 of the tube 2 because the optical fiber 7 is also vibrating. Then, the edge of the inlet end 2 of the tube may produce longitudinal scratches on the optical fiber 7 which may cause the cracking of the optical fiber 7 and the deterioration of a final product. But the protective guide 61 of the above-described structure enables the optical fiber 7 to be readily inserted into the tube 1 and smoothly carried forward therein, without causing any surface defect or damage after insertion.

Next, a method of passing an optical fiber 7 through a tube 1 using the above-described apparatus will be described.

In advance, a coil 5 is formed by winding a tube 1 around a bobbin 27, while an optical fiber 7, which consists of a precoated element fiber, is wound around the feed spool 34. The tube 1 need not always be wound around the bobbin 27 in a single ring, but can be wound in multiple rings. In a coil of multiple rings, the first ring fits closely in a groove 30 cut around the barrel 28 of the bobbin 27, but the second and subsequent rings will fit in the recessed portion formed between the turns of the tube 1 of the preceding ring. Then, the bobbin 27 carrying the wound tube 1 is fastened on the vibrating table 14 in such a manner that the axis of the coil coincides with the central axis C of the vibrating table 14. The leading end of the optical fiber 7 pulled out of the feed spool 34 is inserted through the protective guide 61 into the inlet end of the tube, after passing through the support guide 43, optical fiber feed condition sensor 47 and anti-vibrating guide 54. With the inlet end 2 of the tube being positioned at the lowermost end of the coil 5, the optical fiber 7 is passed through the tube 1 substantially along the tangent of the coil or tube 5.

In the beginning, a length of the optical fiber 7 of 5 to 150 m is manually pushed into the coil of tube by the length of 5 to 150 m. After this, the inner surface of the vibrating tube exerts adequate conveying force to cause the optical fiber to steadily move forward through the tube. The length of the pushed-in optical fiber (i.e., the length of initial insertion) depends on the inside diameter of the tube, outside diameter of the optical fiber, and coefficient of friction between the optical fiber and the inner wall surface of the tube. The insertion is readily achieved if the optical fiber is inserted while vibrating the tube. To ensure the smooth entry of the optical fiber into the tube, a certain amount of clearance must be left between the optical fiber and tube. The clearance should preferably be not less than 0.1 mm.

When the vibrating motors 21, 22 are started, the vibrating table 14 is subjected to a torque working around the central axis C thereof and a force working therealong because of the position and posture in which the vibrating motors 21, 22 are placed as described previously. Consequently, a given point on the vibrating motors 21, 22 vibrates in such a manner as to move along a helical H shown in FIG. 1. The vibration is transmitted from the vibrating table 14 through the fastening jigs 31, bobbin 27 and coil of tube 5 to the optical fiber 7.

The motion of the optical fiber varies with the type of the vibration, properties of the optical fiber, inside diameter of the tube and other parameters. The optical fiber is considered to move forward through the tube in the following manner.

Figure 7:
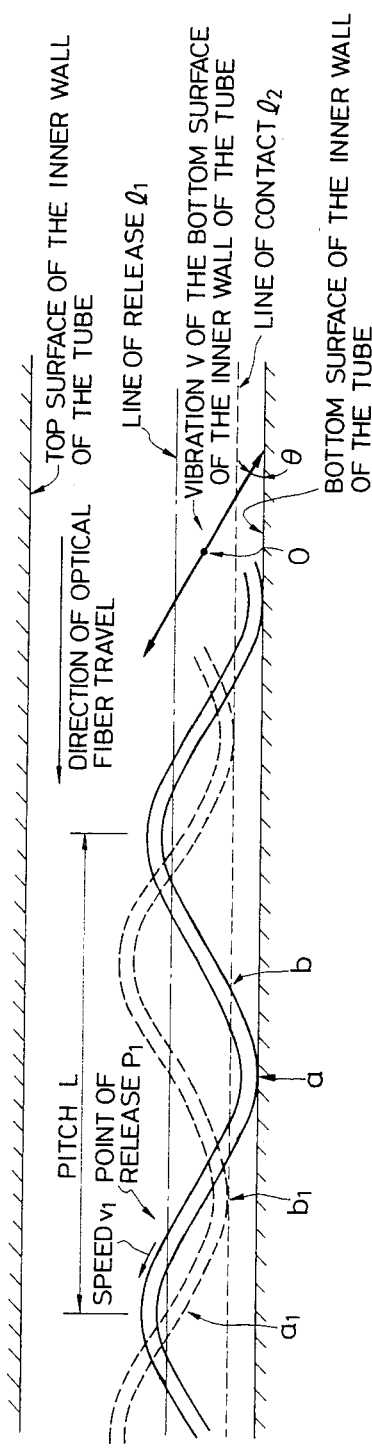
FIG. 7 illustates a principle on which an optical fiber is carried forward in a tube.

As is shown in FIG. 7, the bottom surface of the inner wall of the tube is moving with a vibration V centered on 0. While the angle of the vibration is $\theta$, the maximum acceleration is n times (n sin $\theta > 1$) the acceleration g of gravity. The optical fiber is assumed to contact the bottom surface of the inner wall at pitches L since it is hardly conceivable that the optical fiber is in contact therewith throughout. A point of contact is defined as a. The optical fiber is released when the vertical downward acceleration of the bottom surface of the inner wall becomes equal to g, namely at a point of release $P_1$ on a line of release $l_1$. The released optical fiber begins to jump at a speed $v_1$ and an angle of projection $\theta$. Meanwhile, a non-contact point b moves differently from the point of contact a since the optical fiber is not a rigid substance. The vibration V does not produce as much lifting force as at the point of contact a. After being released on the line of release $l_1$, therefore, the optical fiber is subjected to a depressing force resulting from the motion of the point of contact a. Consequently, the optical fiber falls onto a line of contact $l_2$ at another point of contact $b_1$ that is different from the first point of contact a. If the vibration V of the bottom surface of the inner wall is in the rising direction, the optical fiber continues to move upward until it is released on the line of release $l_1$. If the vibration V is in the descending direction, the optical fiber first drops to the lowermost point and the moves upward until it is similarly released on the line of release $l_1$. Such a surging motion is repeated in each cycle or several cycles of the vibration, whereby the optical fiber is caused to move forward through the tube. The most efficient way is such that the optical fiber begins to jump upward the moment it touches the bottom surface of the inner wall when the line of contact $l_1$ agrees with the line of release $l_2$.

Strictly speaking, friction, repulsion and other phenomena occuring between the optical fiber and the bottom surface of the inner wall of the tube must be considered. If the jumping optical fiber comes in contact with the top surface of the inner wall of the tube, the advancing motion thereof will naturally be different.

When n sin $\theta \leq 1$, the optical fiber will not jump, but may slide forward depending on the condition of friction between the optical fiber and the bottom surface of the inner wall of the tube.

As is obvious from the above, the optical fiber 7 is driven forward through the tube 1 by a component of a force exerted by the inner wall of the tube 1 in the circumferential direction of the coil of tube. Because the axis of the coil of tube is in agreement with the central axis C of the vibrating table 14, the optical fiber 7 in the tube makes a circular motion about the central axis C (a circular motion in the counterclockwise direction P in the embodiment shown in FIG. 2).

Reference is now made to FIG. 1 again.

When the helical vibration is transmitted through the vibrating table 14 to the coil of tube 5, the optical fiber 7 fed from the inlet end 2 of the tube below the coil of tube 5 continuously moves forward through the tube 1 under the influence of the conveying force resulting from the vibration. That is, the vibration of the coil of the tube 5 moves the optical fiber 7 paid off from the feed spool 34 forward through the support guide 43, optical fiber feed condition sensor 47, anti-vibrating guide 54, protective guide 61, inlet end 2 of the tube, coil-formed tube 1 and outlet end 3 of the tube. Thus, the optical fiber 7 is passed through the entire length of the coil of tube 5 in a given time.

Any variation in the passing speed of the optical fiber 7 affects the feed condition thereof at the optical fiber level sensor 49, with the resulting change in the feed condition being instantly detected by the optical fiber level sensor 49. If the optical fiber level sensor 49 senses that the optical fiber 7 is overstretched, a corresponding signal will be sent to the drive motor 38 to increase the rotation speed of the feed spool 34, thereby increasing the feed speed of the optical fiber 7. If the excessive sagging of the optical fiber 7 is sensed, the drive motor 38 will be accordingly controlled to slow down the feed speed of the optical fiber 7. In this way, any abnormal condition in the forward travel of the optical fiber is instantly sensed, corrected and returned to the normal condition.

EXAMPLE

To confirm the effect of this invention, optical fibers were passed through steel tubes under the following conditions (Table 1) using the apparatus shown in FIG. 1 The result of passing are shown in Table 1.

(1) Specimens
  Coils of steel tubes:
    Seven types of steel tube coils prepared by winding seven different steel tubes ranging between 0.8 mm and 2.0 mm in outside diameter and between 0.5 mm and 1.6 mm in inside diameter and having a length of 10 km regularly (in 10 to 20 rings) around steel bobbins having a barrel diameter of 1200 mm.
  Optical fibers:
    Optical fibers, 0.4 mm in diameter, of silica glass (125 μm in diameter) coated with silicone resin.
(2) Vibrating conditions:
    Because the numbers of rings were 10 (Coils Nos. 1 to 6 in Table 1) and 20 (Coil No. 7) on the steel tube coils tested, vibrating conditions were substantially the same at any point of the tube.
    Angle of vibration with respect to the horizontal plane of the coil: 15 degrees
    Frequency of vibration: 20 Hz
    Vertical component of total amplitude: 1.25 to 1.55 mm

TABLE 1

| | Specimens | | | | Vibrating Conditions | | Results of Passing | |
|---|---|---|---|---|---|---|---|---|
| | | | | | Vertical | | | |
| | Outside Dia. (mm) | Wall Thickness (mm) | Inside Dia. (mm) | Length (m) | Dia. of Optical Fiber (mm) | Component of Total Amplitude (mm) | Length of Initial Insertion (m) | Travel Speed (m/min.) | Passing Time (min.) |
| No. | | | | | | | | | |
| 1 | 0.8 | 0.15 | 0.5 | 10,000 | 0.4 | 1.25 | 150 | 2 | 5,000 |
| 2 | 0.9 | 0.15 | 0.6 | 10,000 | 0.4 | 1.35 | 120 | 2.3 | 4,350 |
| 3 | 1.0 | 0.15 | 0.7 | 10,000 | 0.4 | 1.45 | 100 | 2.6 | 3,850 |

TABLE 1-continued

| | Specimens | | | | Vibrating Conditions | | Results of Passing | |
|---|---|---|---|---|---|---|---|---|
| | | | | | Vertical | | | |
| No. | Outside Dia. (mm) | Wall Thickness (mm) | Inside Dia. (mm) | Length (m) | Dia. of Optical Fiber (mm) | Component of Total Amplitude (mm) | Length of Initial Insertion (m) | Travel Speed (m/min.) | Passing Time (min.) |
| 4 | 1.1 | 0.15 | 0.8 | 10,000 | 0.4 | 1.55 | 80 | 3 | 3,330 |
| 5 | 1.2 | 0.15 | 0.9 | 10,000 | 0.4 | 1.55 | 70 | 3.5 | 2,860 |
| 6 | 1.6 | 0.2 | 1.2 | 10,000 | 0.4 | 1.55 | 60 | 4 | 2,500 |
| 7 | 2.0 | 0.2 | 1.6 | 10,000 | 0.4 | 1.55 | 30 | 4 | 2,500 |

The obtained results are shown in Table 1.

Figure 8A:
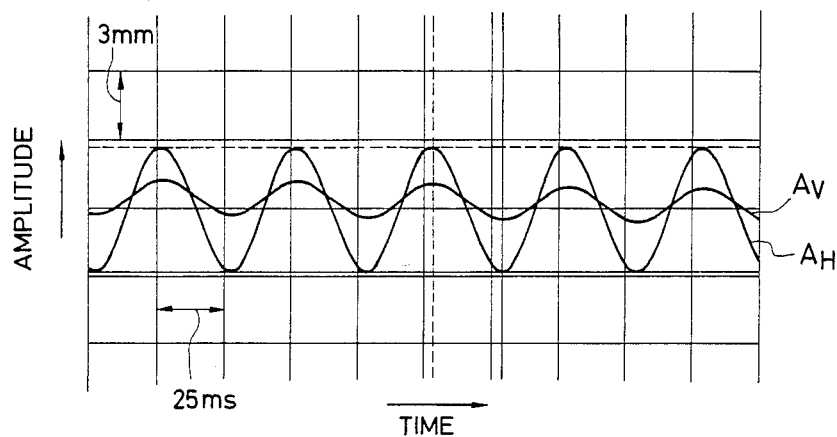
FIGS. 8a and 8b diagramatically slow vibrating conditions of a coil of tube
Figure 8B:
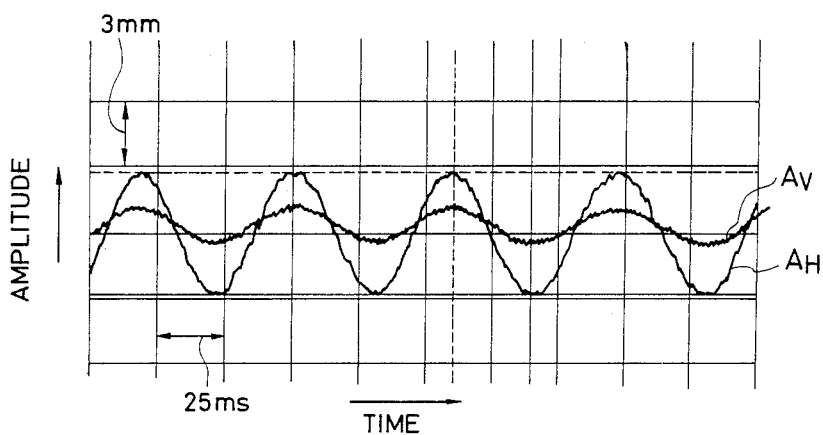

FIGS. 8a and 8b show the vibrations of the bobbin in Example No. 4 shown in Table 1. While the diagram of FIG. 8a shows a condition in which the optical fiber is still not inserted in the tube, another diagram at (b) shows a condition in which 1000 m of the optical fiber has been inserted in the tube. In these diagrams, $A_V$ and $A_H$ respectively designate the vertical and horizontal components of amplitude. As is obvious from FIG. 8 (b), a high-frequency component appeared in the vibration of the coil when the optical fiber has been inserted in the tube. The amplitudes were measured by an accelerometer attached to the bobbin flange.

The test proved that optical fibers can be quite smoothly passed through the entire length of steel tubes in the desired periods of time. As is obvious from Table 1, optical fibers can be satisfactorily inserted into tubes having such a small diameter as 2 mm or under and such a large length as about 10 km. Even in such cases, the optical fibers passed through do not deteriorate or get otherwise damaged.

Now other variations of the component parts of the embodiment just described will be described in the following. Similar parts are designated by similar reference characters, with the description thereof omitted.

Figure 9A:
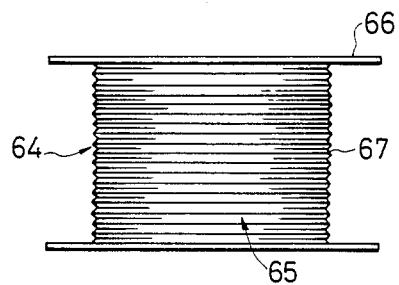
FIGS. 9a and 9b show front views of other examples of bobbins.
Figure 9B:
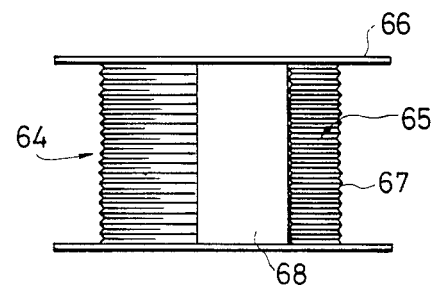

In this invention, a number of circular grooves 67 parallel to the flange 66 of a bobbin 64 may be provided as shown in FIG. 9a. Such grooves 67 need not be provided throughout the whole circumference of the barrel 65. Instead, grooves 67 and a smooth portion 68 may be provided in different portions thereof as shown in FIG. 9b.

Smooth passing of an optical fiber through a tube is impracticable unless the tube is kept in close contact with the bobbin because precise transmission of vibration is not achieved then. The tube readily clings to the barrel in the direction of the barrel diameter, but not so in the direction of the barrel axis. This is likely to entail a disturbance in vertical vibration.

Figure 10:
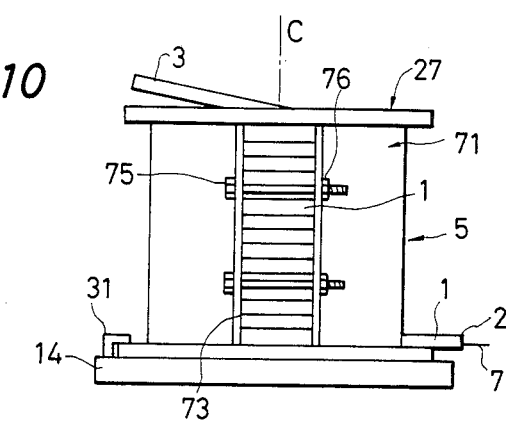
FIG. 10 is a front view showing an example of means to fasten a coil of tube to a bobbin.
Figure 11:
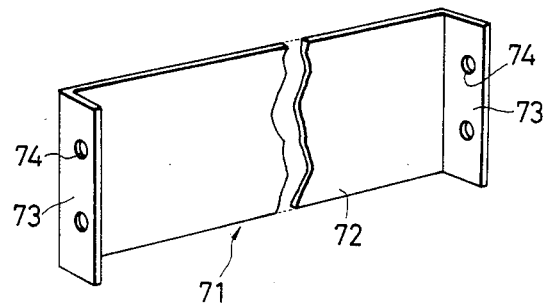
FIG. 11 is a perspective view showing an example of an elastic belt used as the fastening means.

In FIG. 10, the tube 1 coiled around the barrel of the bobbin 27 is wrapped by a wide elastic belt 71 shown in FIG. 11. The elastic belt 71 consists of a flat rubber belt 72 and flanges 73 integrally fastened to both ends thereof. The tube 1 is tightly pressed in the direction of the diameter of the bobbin 27 by fastening the bolts 75 passed through the bolt holes 74 provided in the opposite flanges 73 with nuts 76 after the coil of tube 5 has been wrapped by the rubber belt 72. The tightening force of the belt 72 can be adjusted by turning the nuts 76.

Figure 12:
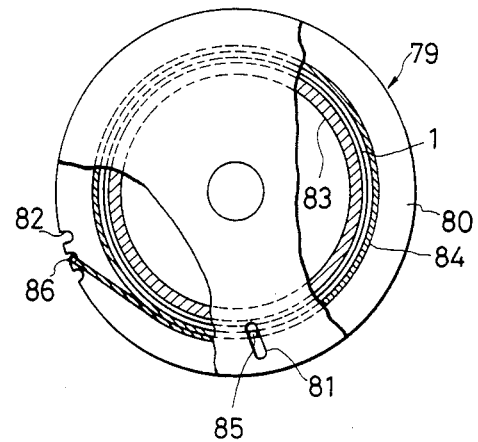
FIG. 12 is a front view showing another example of the means to fasten a coil of tube.
Figure 13:
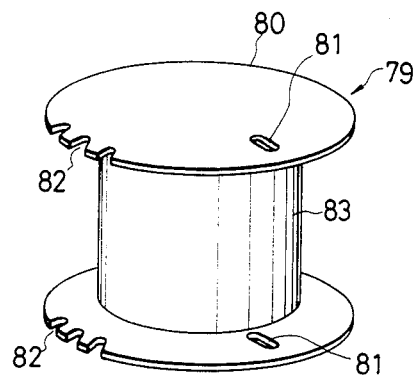
FIG. 13 is a perspective views of a bobbin used with the fastening means shown in FIG. 12.
Figure 14:
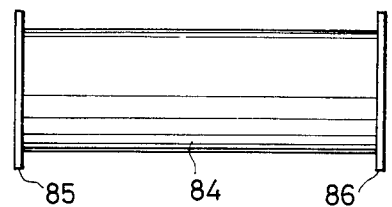
FIG. 14 is a front view of an elastic belt used with the fastening means shown in FIG. 12.

FIG. 12 shows another means for fastening the coil of tube 5 of the bobbin. A bobbin 79 has a slot 81 and a plurality of stopper grooves 82 provided in each flange 80 thereof as shown in FIG. 13. The elastic belt consists of a rubber belt 84 having stopper rods 85, 86 fastened to both ends thereof. After the tube 1 has been wound around the bobbin 79, the top and bottom ends of one stopper rod 85 on the belt 84 are inserted in the slots 81 in the top and bottom flanges. After the belt 84 has been wound around the tube 1, for example, clockwise in such a manner that both ends thereof overlap each other to some extent, the belt 84 is fastened by inserting the top and bottom ends of the other stopper rod 86 in an appropriate stopper groove 82. The elastic belt 84 thus keeps the tube 1 in close contact with the barrel 83 of the bobbin 27, with the tightening force thereof being adjusted by choosing a stopper groove 82 in an appropriate position.

Figure 15:
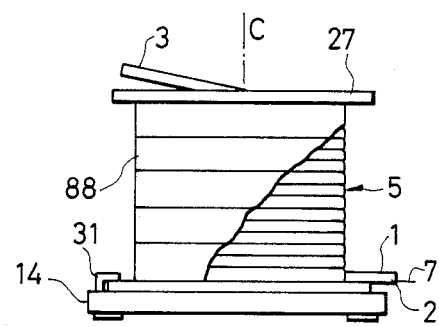
FIG. 15 is a partially cross-sectional front view showing still another example of the means to fasten a coil of tube.

FIG. 15 shows still another means for fastening the coil of tube to the bobbin 27. After the tube 1 has been wound around the barrel of the bobbin 27 (in a single or more rings), the tube 1 is fastened in position by a adhesive tape 88 that is wrapped therearound as illustrated. To ensure secure fastening, the adhesive tape 88 is wrapped in a partially or fully overlapped manner. Any kind of adhesive tape serves the purpose so long as it has enough adhesive force to tightly press the tube 1 wound around the barrel of the bobbin 27 thereagainst and keep the tube 1 in such tightly pressed condition for a certain period of time. But the adhesive tape 88 should preferably be of such type as can be easily peeled off by hand when the tube 1 is detached from the bobbin 27 after the optical fiber 7 has been passed therethrough. For example, gummed tape is one of the most suitable adhesive tapes of such kind.

Any of the above-described fastening means keeps the tube 1 in close contact with the barrel of the bobbins 27, 79, thereby ensuring precise transmission of the vibration of the bobbin 27, 79 to the tube 1 while keeping to a minimum the freedom and wild vibration of the tube 1. With the undesirable motion of the tube in the direction of the bobbin axis and diameter thus effectively held down, the optical fiber can be smoothly and efficiently passed through the coil of tube. There is yet another embodiment in which the tube is wound around a bobbin that is circularly divided into two or more segments. Then, the bobbin is expanded outward from inside, using a hydraulic jack, link mechanism or the like, thereby bringing the coil of tube into close contact with the bobbin.

Figure 16:
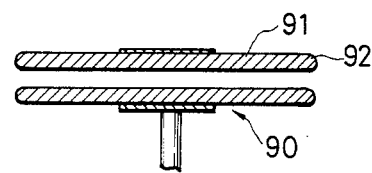
FIG. 16 is a cross-sectional view showing another example of the anti-vibrating guide.

FIG. 16 shows another embodiment of the anti-vibrating guide. The guide cylinder proper 91 of an anti-vibrating guide 90 has a heavier wall thickness. The guide ends 92 are rounded off to leave no angular corners thereat. The anti-vibrating guide is of course not limited to the illustrated embodiments, but may be of any shape and structure so long as no damage is caused to the optical fiber at the inlet end 2 of the tube.

Figure 17:
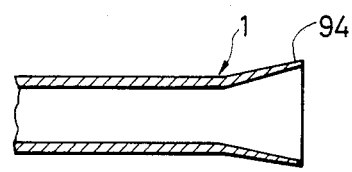
FIG. 17 is a cross-sectional view showing another example of the protective guide provided at the inlet end of a tube.

FIG. 17 shows another embodiment of the protective guide. Instead of attaching a separate protective guide, the inlet end 2 of the tube itself may be expanded to form a larger-diameter portion 94 as shown in FIG. 17. This embodiment will also produce similar results.

A pair of rollers covered with sponge or other cushioning material or a piece of cushioning material that may hold the optical fiber in such manner as not to impede the smooth travel thereof may be provided near the inlet end of the tube as the protective guide.

The number of optical fiber to be passed through a tube is not limited to one. A plurality of optical fibers may be passed through if the relationship between the inside diameter of the tube and the diameter of the optical fiber 7 allows.

This invention is of course not limited to a combination of the optical fiber consisting of a precoated element fiber and the steel tube used in the embodiments described hereinbefore. Many other variations are possible, such as those in which an optical fiber or cable is passed through tubes if aluminum, synthetic resin or other materials. The optical fiber passed through the tube may be subjected to a processing that reduces the cross-sectional area thereof. Other appropriate modifications may be introduced as required. The optical fiber may be fed from the top of the coil of tube. The central axis of the coil of tube should preferably agree with the central axis of the helix, through such agreement is not an absolute requisite. The central axis of the coil of tube should preferably be vertical, but need not always be so. For initial insertion of the optical fiber, pinch rollers or other mechanical means may be used instead of manual insertion.

What is claimed is:

1. An apparatus for passing an optical fiber through a tube which comprises:
   a cylindrical body around which the tube to admit the optical fiber is coiled;
   means to vibrate the cylindrical body in such a manner that a given point of the tube reciprocates along a helical path; and
   means to feed the optical fiber into the coil of tube being thus vibrated from one and thereof, whereupon the optical fiber fed into the tube moves forward under the influence of the intermittent conveying force exerted by the inner wall of the tube in the direction of the circumference of the coil of tube, said feeding means including means to positively feed the optical fiber at a speed substantially the same as the speed of forward movement of the optical fiber through the coil of tube.

2. The apparatus according to claim 1, in which a helical groove to admit the tube is cut in the circumference of the cylindrical body.

3. The apparatus according to claim 1, in which a plurality of circular and parallel grooves to admit the tube are cut in the circumference of the cylindrical body.

4. The apparatus according to claim 1, in which a belt comprising an elastic member is provided to tighten the tube coiled around the cylindrical body against the circumference thereof.

5. The apparatus according to claim 1, in which an adhesive tube is provided to tighten the tube coiled around the cylindrical body against the circumference thereof.

6. The apparatus according to claim 1, in which a tubular anti-vibrating guide is provided next to the inlet end of the tube into which the optical fiber is fed and along the feeding direction of the optical fiber, both ends of the tubular anti-vibrating guide being expanded outward to form tapered portions.

7. The apparatus according to claim 1, in which a tubular anti-vibrating guide is provided next to the inlet end of the tube into which the optical fiber is fed and along the feeding direction of the optical fiber, both ends of the tubular anti-vibrating guide being outwardly expanded and rounded off.

8. The apparatus according to claim 1, further comprising means to sense the difference between the passing speed and feed speed of the optical fiber and means to control the feed speed of the optical fiber feeding means on the basis of the speed difference sensed by said sensing means.

9. The apparatus according to claim 8, in which the sensor is an image sensory means disposed between the inlet end of the tube and the spool to sense the top and bottom positions of the optical fiber, thereby determining the amount of sagging of the optical fiber.

10. The apparatus according to claim 1, in which the inlet end of the tube to admit the optical fiber is flared toward the upstream side like a funnel.

11. An apparatus for passing an optical fiber through a tube which comprises:
    a base;
    a vibrating table mounted on the base through springs interposed therebetween;
    vibrating means attached to the vibrating table, the vibrating means being adapted to vibrate the vibrating table in such a manner that a given point of the vibrating table reciprocates along a helix having a vertical central axis;
    a bobbin to coil the tube therearound fastened of the vibrating table in such a manner that axis of the bobbin coincides with the central axis of said helix;
    a spool carrying a coil of the optical fiber disposed beside the bobbin, the spool being adapted to feed the optical fiber into the coiled tube around the bobbin from one end thereof;
    driving means to rotate the spool in such a manner that the optical fiber wound therearound is fed into the tube coiled around the bobbin;
    a sensor to sense the difference between the passing speed and feed speed of the optical fiber; and
    means to control the spool driving means on the basis of the speed difference sensed by the sensor.

12. The apparatus according to claim 11, in which the vibrating means comprises a motor having eccentric weights on the rotating shaft thereof.

13. The apparatus according to claim 11, in which the sensor is an image sensor disposed between the inlet end of the tube and the spool to sense the top and bottom positions of the optical fiber, thereby determining the amount of sagging of the optical fiber.

14. An apparatus for passing an optical fiber through a tube which comprises:
    a cylindrical body around which the tube to admit the optical fiber is coiled;
    means to vibrate the cylindrical body for causing a given point of the tube to reciprocate along a helical path;
    means for feeding the optical fiber into the coil of tube being thus vibrated from one and thereof, whereupon the optical fiber fed into the tube moves forward under the influence of the intermittent conveying force exerted by the inner wall of the tube in the direction of the circumference at the coil of tube; and
    means for keeping the optical fiber from vibrating upstream of the entry-end of the tube.

* * * * *